United States Patent
Macellin-Dibon

(10) Patent No.: US 6,967,641 B1
(45) Date of Patent: Nov. 22, 2005

(54) IMAGE DISPLAY APPARATUS

(75) Inventor: Eric Macellin-Dibon, West Sussex (GB)

(73) Assignee: Thomson Training & Simulation Limited, West Sussex (GB)

( * ) Notice: Subject to any disclaimer, the term of this patent is extended or adjusted under 35 U.S.C. 154(b) by 430 days.

(21) Appl. No.: 10/048,530

(22) PCT Filed: Jul. 14, 2000

(86) PCT No.: PCT/GB00/02729

§ 371 (c)(1),
(2), (4) Date: Apr. 9, 2002

(87) PCT Pub. No.: WO01/09676

PCT Pub. Date: Feb. 8, 2001

(30) Foreign Application Priority Data

Jul. 31, 1999 (GB) .................................. 9917973

(51) Int. Cl.[7] .............................................. G09G 3/34
(52) U.S. Cl. ........................ 345/109; 345/690; 345/32
(58) Field of Search ............................ 345/4.6, 32, 88, 345/89, 98, 100, 109, 690; 348/740, 744; 359/237; 353/48.88

(56) References Cited

U.S. PATENT DOCUMENTS 5,140,428 A    8/1992  Park
5,481,320 A    1/1996  Konuma et al.
6,243,055 B1 * 6/2001  Fergason .................... 345/32

FOREIGN PATENT DOCUMENTS

| EP | 0504813 A2 | 9/1992 |
| EP | 0631434 A1 | 12/1994 |
| EP | 0895116 A2 | 2/1999 |
| GB | 2102176 A | 1/1983 |
| WO | WO 99/08257 | 2/1999 |

OTHER PUBLICATIONS

Patent Abstract of Japan, vol. 016, No. 022 (E-1156), Jan. 20, 1992, and JP 03 236696 A, Oct. 22, 1991.

* cited by examiner

Primary Examiner—Regina Liang
Assistant Examiner—Duc Q Dinh
(74) Attorney, Agent, or Firm—Nixon & Vanderhye P.C.

(57) ABSTRACT

An image display apparatus includes a light valve for controlling at least the intensity of light projected along an optical path from a light source through the light valve. The light valve has a plurality of light transmitting elements at least the translucency of each of which may be adjusted periodically such that the translucency of each element is substantially constant except during intervals within which the translucency is being adjusted. A shutter is provided to obstruct the light path through at least one of the light transmitting elements during intervals within which the translucency of the element is being adjusted.

28 Claims, 9 Drawing Sheets

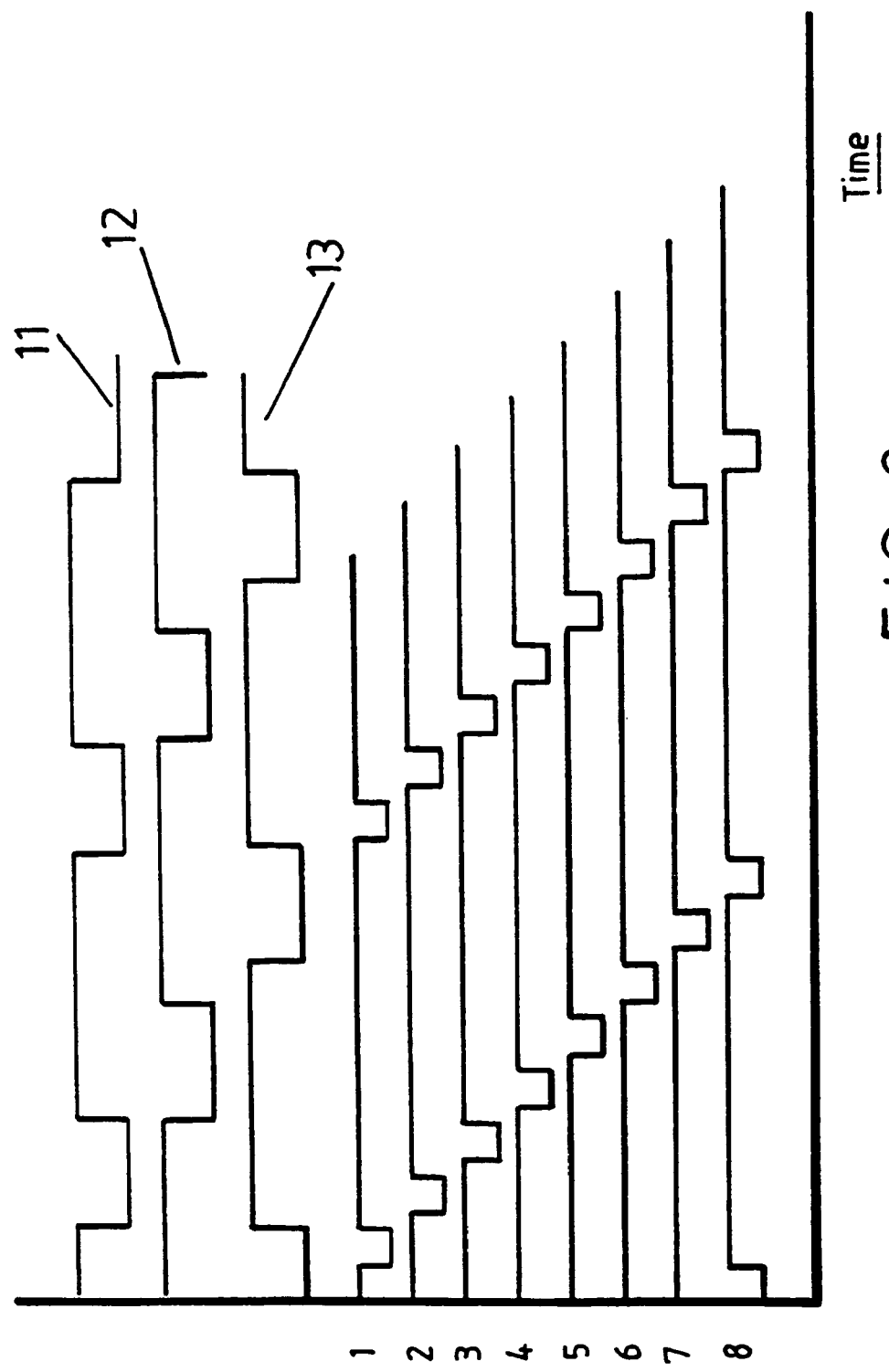

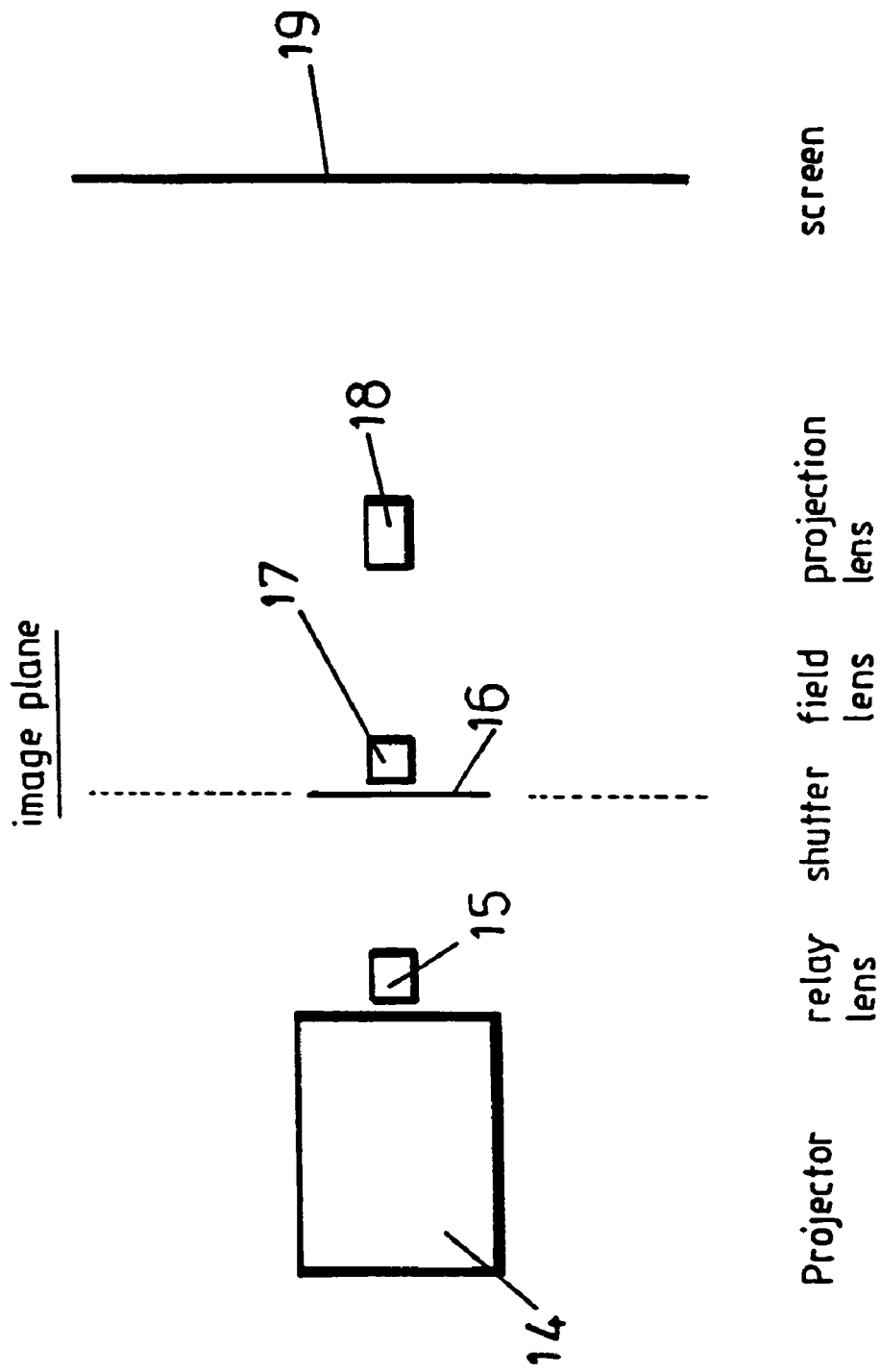

IMAGE DISPLAY APPARATUS

This application is the US national phase of international application PCT/GB00/02729 filed 14 Jul. 2000, which designated the US.

BACKGROUND OF THE INVENTION

1. Field of the Invention

The present invention relates to an image display apparatus comprising a light valve.

2. Related Art

In general terms, a light valve is a device which has light transmission or reflection characteristics that can be made to vary with an applied electrical quantity. Liquid crystal display (LCD) panels are one example of a well known device used as a light valve in image display systems within a wide range of equipment. LCD panels are passive (do not generate light) and must be illuminated by an external light source. For instance, conventional LCD panels may either be back lit with a dedicated light source or may be reflective relying on ambient light for illumination. LCD panels have also been developed for use as light valves in image projection systems.

A typical LCD panel comprises a matrix array of liquid crystal cells each of which constitutes a single pixel of the displayed image. The image displayed is determined by the state of each cell which is controlled by appropriate electrical drivers applied to individual columns and lines of cells in the matrix. Typically video data is supplied to column drivers and each line of the panel (and thus the image) is updated in sequence by line drivers. The time duration required to update a single line is referred to as the line period and the time duration between successive updates of any given line is referred to as a frame period. The individual liquid crystal cell settings of each line remain fixed during a frame period so that each line acts as a light valve and the image displayed is flicker free.

A well known problem affecting conventional LCDs is the "smearing" of images, or portions of an image, which move rapidly across the display. For instance, the most widely used form of liquid crystal cell is the twist nematic cell which has a typical response period which falls in the range of 10 to 40 milliseconds. In contrast, video display screens conventionally operate at around 50 Hz thus having a frame period of the order of 20 milliseconds. As the frame period approaches or exceeds the LCD cell response time, visible artefacts, such as loss of contrast of the leading edge and smear of the trailing edge of a moving image element, are introduced into the display with a resultant loss of dynamic resolution.

One known method of combating this problem is to operate the LCD panel at an elevated temperature to reduce the viscosity of the liquid crystal and thereby reduce response time. An improvement of about 30% of the cell response time can be obtained in this way but care has to be taken to ensure temperatures do not exceed the liquid crystal stability limit above which the panel may cease to work.

An alternative approach to combating resolution problems is to apply an over voltage to the liquid crystal of the LCD panel. This approach however improves only the response time between grey levels and has no effect on the smearing from black to white and vice versa.

BRIEF SUMMARY

It is an object of the present exemplary embodiments to provide an image display apparatus which obviates or mitigates the above disadvantages.

According to the present embodiments there is provided an image display apparatus comprising a light valve for controlling at least the intensity of light projected along an optical path from a light source through the light valve, the light valve defining a plurality of light transmitting elements at least the translucency of each of which may be adjusted periodically such that the translucency of each element is substantially constant except during intervals within which the translucency is being adjusted, wherein a shutter is provided to obstruct the light path through at least one of the light transmitting elements during intervals within which the translucency of the element is being adjusted.

The apparatus according to the present exemplary embodiments uses one or more shutters to decrease the effective display response time and hence improve the quality of display, enabling display of an image with moving high contrast elements without smear. Further details of the manner in which this is achieved, and further advantageous features will be apparent from the following description.

BRIEF DESCRIPTION OF THE DRAWINGS

Specific embodiments of the present invention will now be described, by way of example only, with reference to the accompanying drawings, in which:

FIG. 8 is a graphical illustration of the operation of the shutter assembly of FIG. 7; and FIG. 9 is a schematic illustration of a projection system in accordance with the second embodiment of the present invention; and

DETAILED DESCRIPTION OF EXEMPLARY EMBODIMENTS

Figure 1:
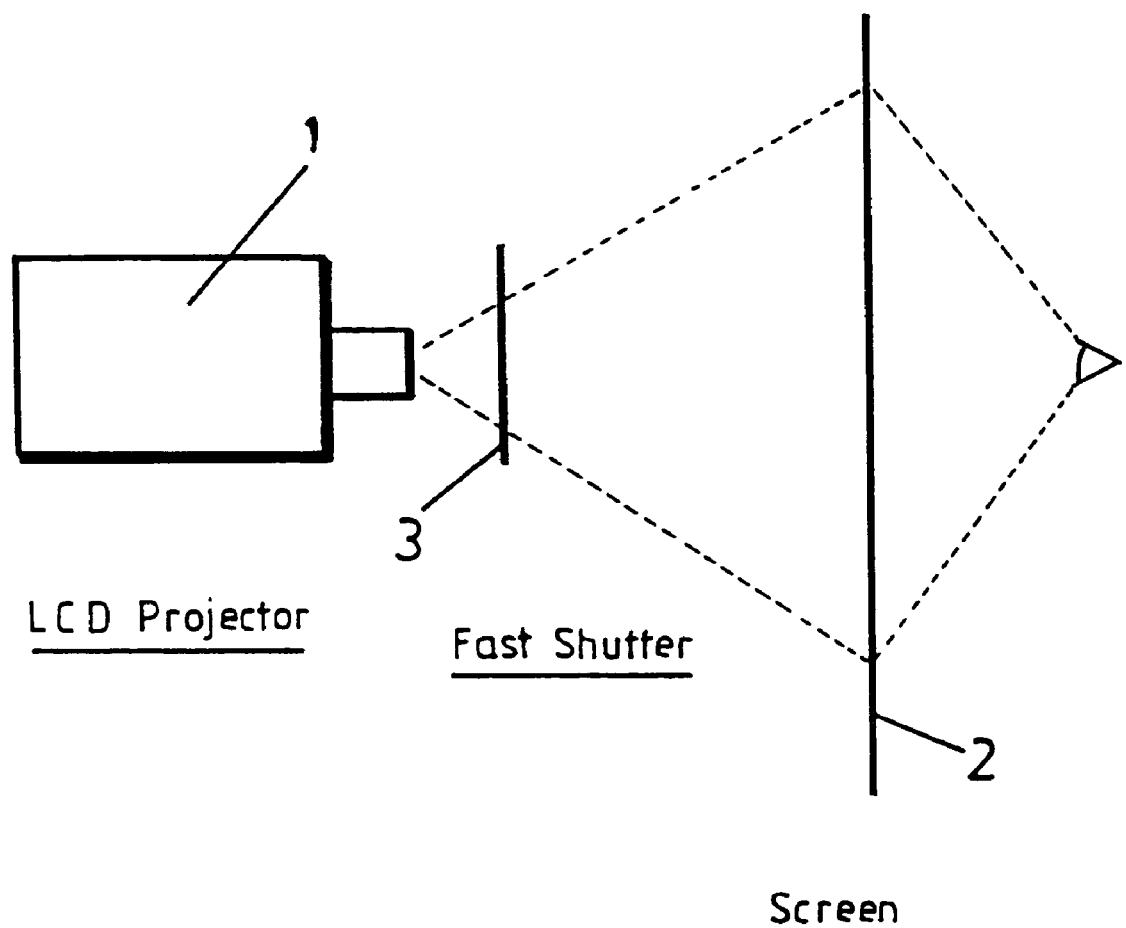
FIG. 1 is a schematic illustration of an image projection system in accordance with a first embodiment of the present invention.

Referring to FIG. 1, the illustrated projection system is a back projection system comprising an LCD projector and lens system 1, a back projection screen 2, and a fast acting shutter 3 mounted in the image projection path between the projector 1 and screen 2. The projector 1 may be a conventional projector comprising a conventional LCD panel and lens system. The shutter 3, which may for example be a Ferro-electric crystal cell or a Pi-cell, is included in accordance with the present invention to address the LCD resolution limitations mentioned above. Operation of the shutter 3 is described in more detail further below.

Figure 2:
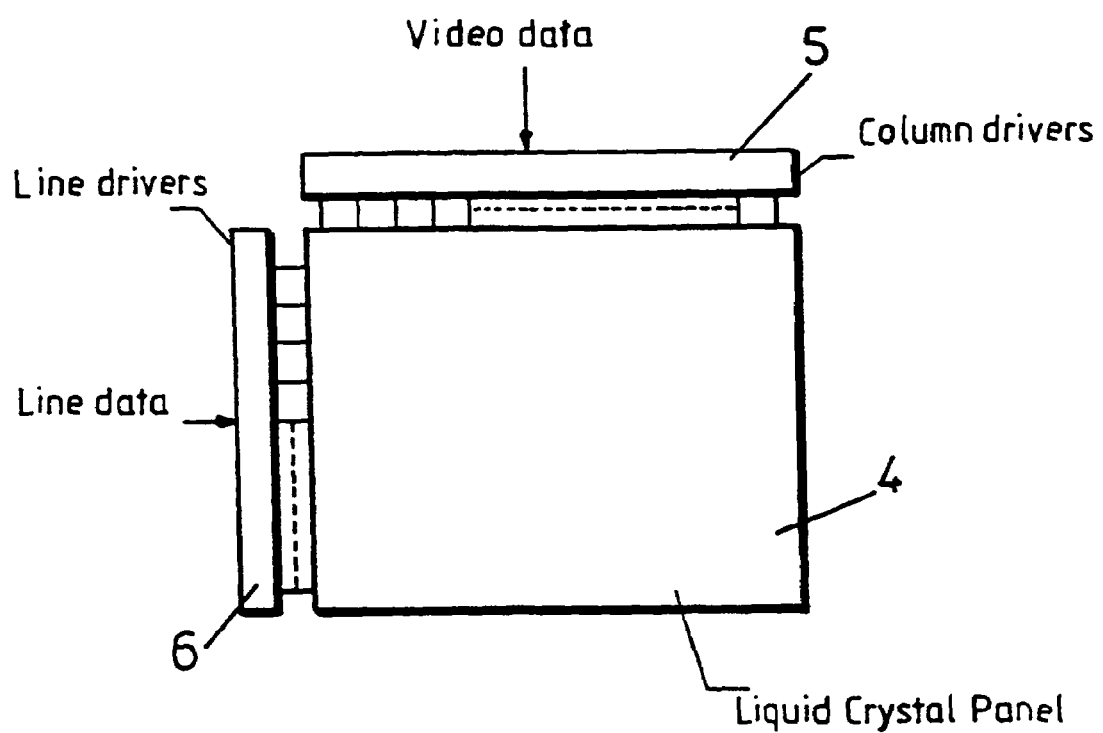
FIG. 2 is a schematic illustration of a conventional LCD panel such as maybe incorporated in the projector of the projection system of FIG. 1.

A conventional LCD panel which may be incorporated in the projector 1 is schematically illustrated in FIG. 2. The panel 4 comprises a rectangular matrix array of liquid crystal cells arranged in lines and columns (not illustrated). Video data is supplied to each cell by the application of a voltage to each respective column of cells by a column driver 5. Similarly, line data is provided to each cell of successive lines of the matrix array by a line driver 6. Since the LCD panel and its operation may be entirely conventional further details of that operation not be given here.

Figure 3:
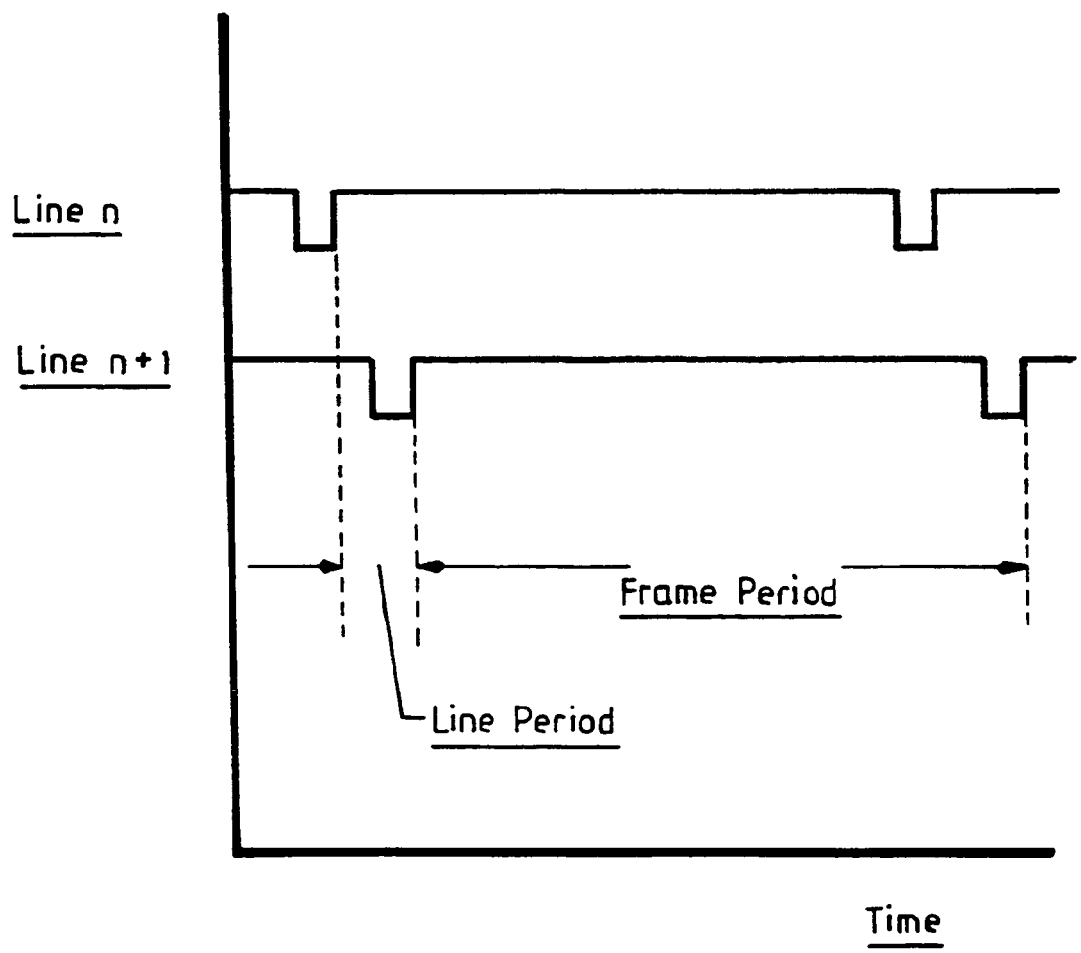
FIG. 3 is a graphical illustration of the updating scheme for the lines of the LCD panel of FIG. 1.

As mentioned above, each line of liquid crystal cells is updated in sequence once every frame period, the time it takes to update each line being a line period. This image updating scheme is graphically illustrated in FIG. 3 which shows how the frame period of each successive line in the display is offset from the previous line by one line period.

Figure 4:
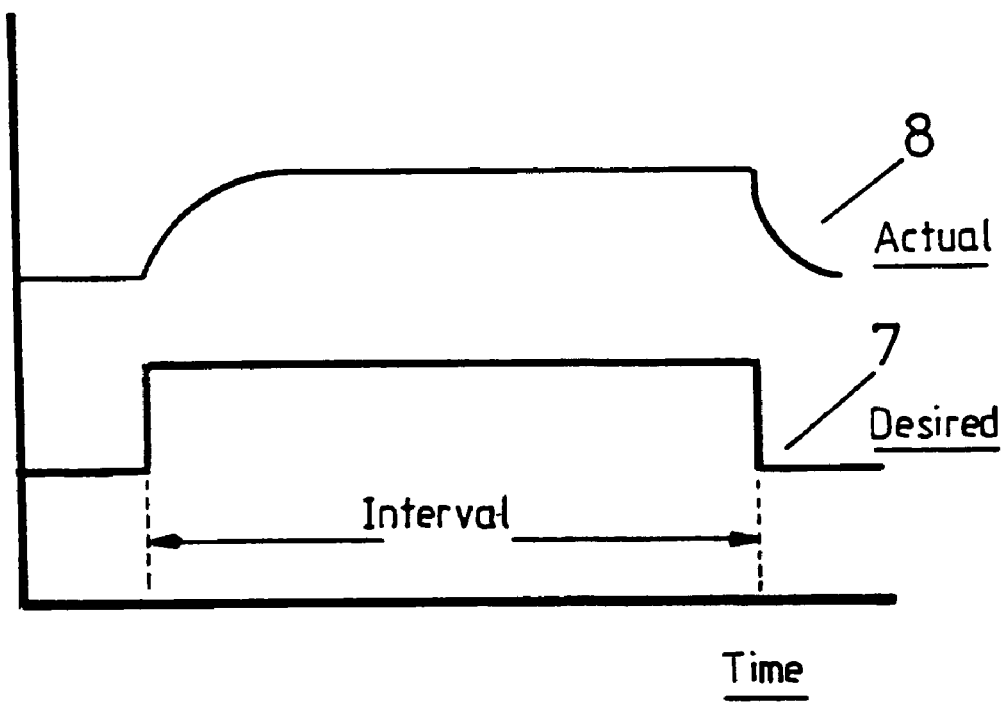
FIG. 4 is a graphical illustration of the effects of the response delay of a liquid crystal cell of the LCD panel of FIG. 2.

A typical transmission response of an individual LCD cell is illustrated in FIG. 4. Referring to FIG. 4, line 7 is the desired cell response over time illustrating that the cell is required to switch sharply from low to high transmission states (and vice versa) at the beginning and end of a time interval of one or more frame periods. The actual response of a typical cell to the control input corresponding to line 7 is illustrated by line 8. This shows that when the cell is set to transmit a high light level, the cell transmission initially increases with time and thus approaches the desired level asymptotically. Similarly, at the end of the time interval when the cell is "turned off", the cell transmission level does not drop instantly to zero but falls to zero asymptotically. These delays in the cell response produce visible artefacts in the pixel displayed by the cell, resulting in a "soft" leading edge and a "tail" at the trailing edge degrading the displayed picture and reducing the dynamic resolution compared with static resolution.

Figure 5:
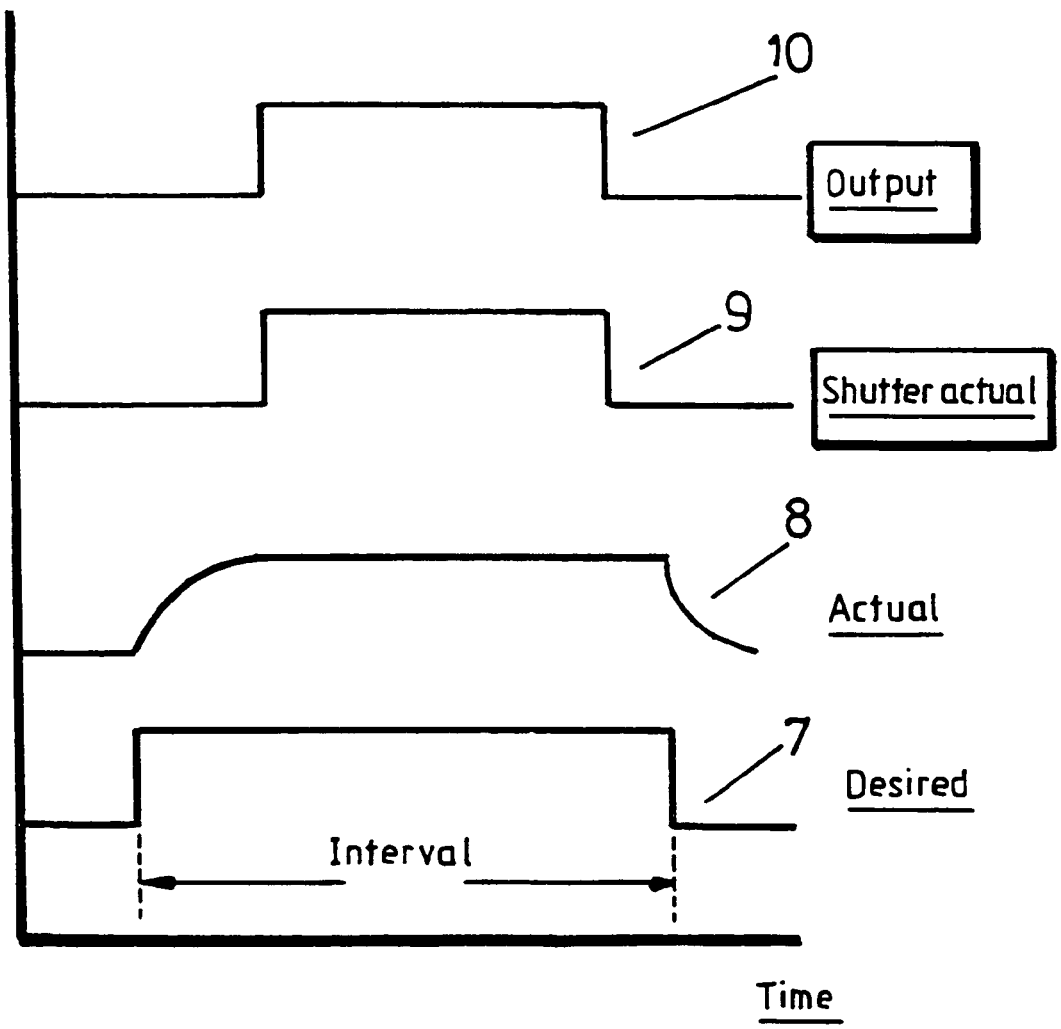
FIG. 5 illustrates operation of the shutter of FIG. 1 on the output of a single liquid crystal cell of the LCD panel.

The deleterious effects of the response delay of the pixel of FIG. 4 may be eliminated, and the effective response time decreased, in accordance with the present invention, by appropriate operation of the shutter 3. That is, by opening the shutter during the pixel steady state, and closing the shutter during the asymptotic response periods, the asymptotic response regions are not displayed. Such an effect of the shutter operation on the single liquid crystal cell of FIG. 4 is illustrated by FIG. 5. Lines 7 and 8 once again represent the desired and actual cell responses respectively over a time interval (which for simplicity may be regarded as a single frame period). Line 9 illustrates operation of the shutter which is opened for only a part of the frame period corresponding to the steady state of the actual cell response. Since light will only be transmitted by the cell when the shutter is open, line 10 illustrates the actual output of the cell, i.e. the projected pixel, as a result of the shutter operation. This shows how the asymptotic regions of the cell response are eliminated from the projected pixel and the response time is effectively decreased.

It will be apparent that there will be an overall reduction in the light output by the cell due to closure of the shutter. The light output verses image resolution can be adjusted by appropriate control of the shutter open and closed periods.

Optimisation of the shutter operation for an LCD panel is complicated by the fact that the frame period of each successive line is offset by one line period from the previous line. The operation of the shutter on a simple eight line LCD panel is illustrated in FIG. 6.

Figure 6:
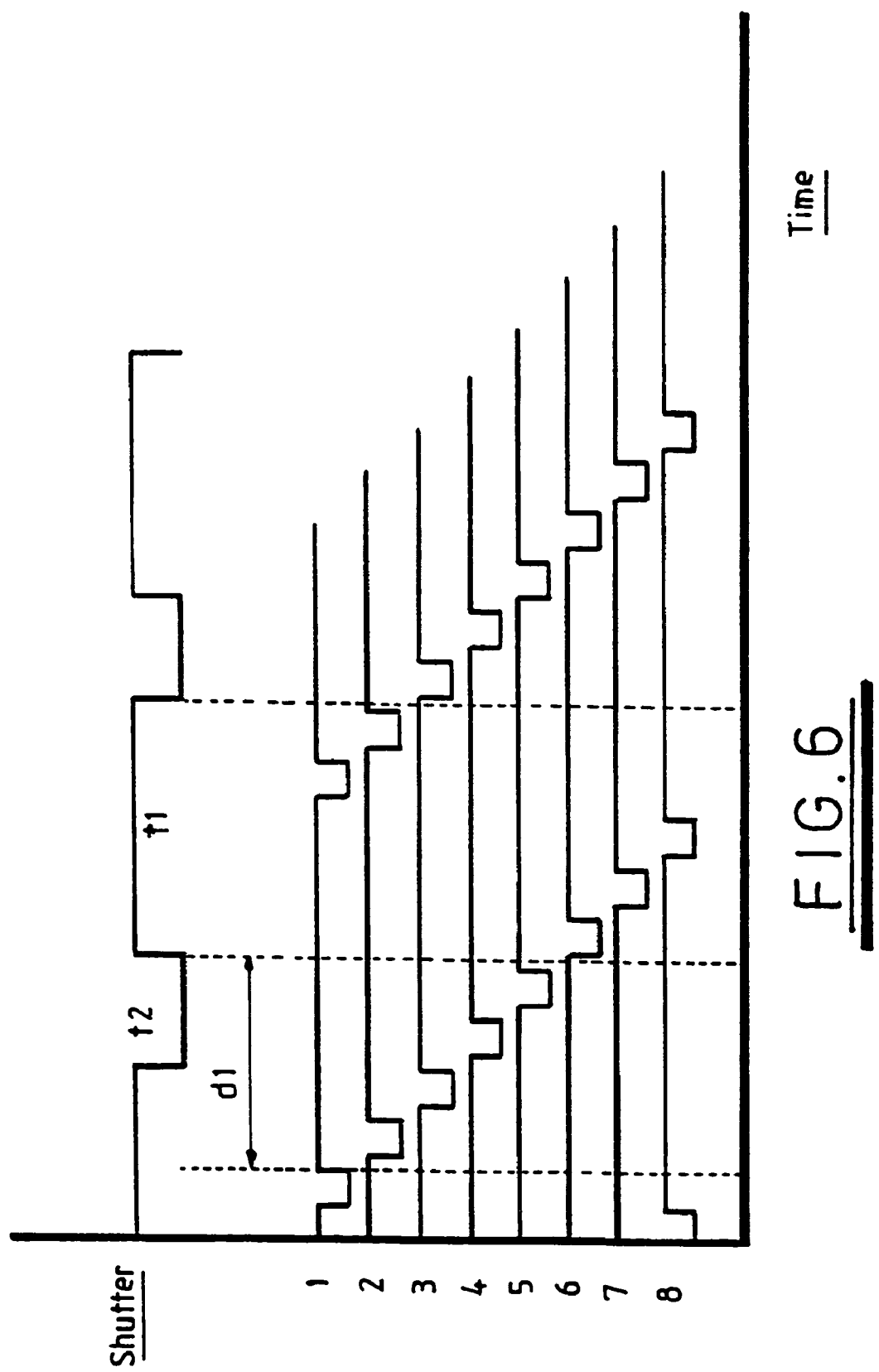
FIG. 6 graphically illustrates the effect of the shutter operation on successive lines of an LCD display panel.

In FIG. 6 the time period indicated as t1 is the shutter open period and the time period indicated as t2 is the shutter closed period, the combination t1 plus t2 being equal to the frame period. The time period indicated as d1 is the delay between initiation of the first line period and the opening of the shutter. It will be seen from FIG. 6 that with the illustrated shutter timing scheme the LCD line numbers 3, 4 and 5 will be sharpened for dynamic images whereas lines 1, 2, 6, 7 and 8 will not. As mentioned above, the overall brightness of the displayed image will be reduced, the reduction in pixel brightness being t1/(t1+t2) for each pixel compared with the output that would be achieved without the shutter.

Increasing t1 without changing the delay d1 will increase the brightness of the image but will mean that line 3 (at least) will not be sharpened. Conversely, reducing t1 will add other lines (firstly line 2 and then line 1, depending on the amount of reduction) to the sharpened image at the expense of further reducing the overall image brightness. Thus, it is possible to trade off the image brightness against the number of lines sharpened. Furthermore, by varying the delay d1 it is possible to adjust which group of lines will actually be sharpened. Non-sharpened lines are decreased in brightness but otherwise are not affected.

Although, as illustrated in FIG. 6, with a single shutter it would not be possible to sharpen all lines of a practical LCD display without reducing the brightness to an unacceptable level, simply improving the sharpness of some lines will be sufficient to effectively remove the visible smear of moving elements of the displayed image. It will be appreciated that with operation of the shutter the image will no longer be flicker free. However, the critical flicker frequency of a displayed image is a well understood phenomenon, and the frame period and display brightness can be selected so as to be within acceptable levels for the display operational requirements.

Figure 7:
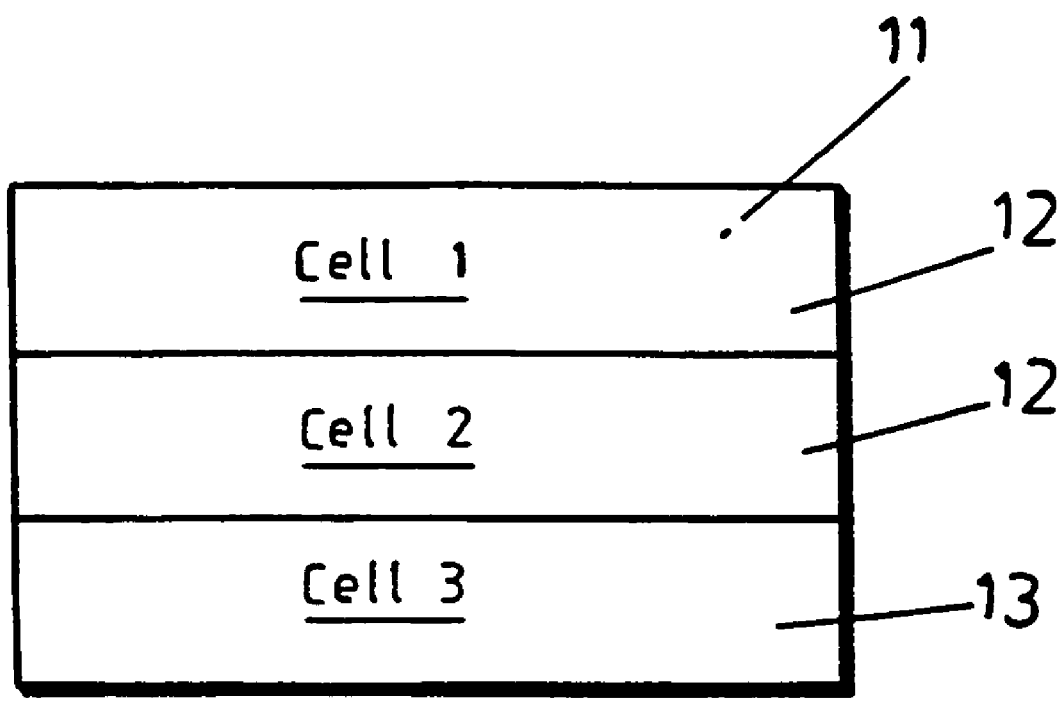
FIG. 7 is a schematic illustration of a shutter assembly of a second embodiment of the present invention.

It is possible to increase the number of sharpened lines without reducing overall image brightness by replacing the single shutter of the above described embodiment of the invention, with multiple shutters (or a single shutter comprising multiple elements), each operating on only a portion of the displayed image. FIG. 7 is a schematic illustration of a shutter assembly comprising three horizontal shutter elements. If the shutter is mounted so that each element is horizontal and aligned with the display lines then each element of the shutter will affect only a limited number of lines. FIG. 8 is an illustration of how a three element shutter such as that illustrated in FIG. 7 could be used to sharpen all of the lines of an eight line display. In the illustrated arrangement the top element 11 of to the shutter affects lines 1 and 2, the middle 12 element affects lines 3, 4 and 5, and the bottom element 13 affects lines 7 and 8. In each case the shutter open period (t1) is the same but the open period for successive horizontal shutter elements is delayed by a time corresponding to the frame period divided by the number of horizontal elements (i.e. three).

Clearly the number of shutter elements can be increased and the relative timing of the shutter open periods adjusted accordingly.

With a multi element shutter arrangement it would be undesirable to have a display line falling on the junction between two adjacent elements of the shutter which would result in that display line having a longer or shorter display time than the majority of lines in the display. This can be avoided by positioning to the shutter at the image plane. A practical arrangement of such a projector system is illustrated in FIG. 9. With the system of FIG. 9, an LCD projector 14 and associated relay lens 15 produce an intermediate image on a shutter 16 positioned in an intermediate image plane. A field lens 17 adjacent the image plane, and a projection 18 lens relay the image passing through the shutter onto a back projection screen 19. In practice, if the shutter is positioned at the image plane then the structure of the shutter will be imposed on the projected image so that it is desirable to displace the shutter slightly from the image plane (as is normally done with the field lens for the same reason).

It will be appreciated that in describing the invention reference has been made to a simple eight line LCD panel but that in practice the LCD panel will have many more lines. Similarly, a multi element shutter such as that illustrated in FIG. 8 may have only two elements, or more than the three elements illustrated.

It will also be appreciated that the invention is not limited in application to any particular type of light valve or LCD panel, or any particular type of image display system. For instance, the display system need not be a back projection system or indeed a projection display system at all. Rather, the invention can be utilised in other display systems incorporating a light valve such as, for instance, a liquid crystal display.

Other possible modifications of the above described embodiments of the invention will be readily apparent to the appropriately skilled person.

What is claimed is:

1. An image display apparatus comprising:
   a light valve for controlling at least the intensity of light projected along an optical path from a light source through the light valve, the light valve defining a plurality of light transmitting elements at least the translucency of each of which may be adjusted periodically such that the translucency of each element is substantially constant except during intervals within which the translucency is being adjusted, and
   a shutter disposed and operated to obstruct the light path through at least one of the light transmitting elements during intervals within which the translucency of the element is being adjusted.

2. An image display apparatus as in claim 1, wherein said shutter obstructs the light path through a plurality of said light transmitting elements.

3. An image display apparatus as in claim 1, wherein said shutter obstructs the light path through all of the light transmitting elements of the light valve.

4. An image display apparatus as in claim 2 wherein:
   the light transmitting elements are provided in groups of at least one element,
   each group being adjusted sequentially at a regular adjustment period,
   each group being adjusted as necessary and at most once each adjustment period, and
   the shutter obstructs the light path for a fixed portion of each adjustment period.

5. A display apparatus as in claim 4, wherein each group of light transmitting elements comprises more than one element.

6. A display apparatus as in claim 1, wherein intervals during which the light path is unobstructed by the shutter are timed to coincide with periods during which more than one of said light transmitting elements or group of elements is in a constant state.

7. Apparatus as in claim 5 wherein the light transmitting elements are arranged in a matrix array of rows and columns, each one of said rows or columns constituting one of said groups of elements.

8. An image display apparatus as in claim 1, comprising a plurality of said shutters, each shutter operating to obstruct a different one, or group, of said light valve transmitting elements.

9. An image display apparatus as in claim 8, wherein the obstructing intervals of each shutter is offset from the obstructing interval of at least one other shutter.

10. An image display apparatus as in claim 9, wherein each of said plurality of shutters has an obstructing interval offset from the obstructing interval of every other shutter.

11. An image display apparatus as in claim 4, wherein
    each of said plurality of shutters has an obstructing interval offset from the obstructing interval of every other shutter;
    each shutter of the group operates sequentially, and
    each shutter in the sequence has an obstructing interval offset from the preceding shutter in the sequence by a time duration equal to the adjustment period of the light valve divided by the number of shutters.

12. An image display apparatus as in claim 1, wherein the light valve is an LCD panel.

13. An image display apparatus as in claim 1, wherein the image is displayed on a display surface by projecting light through the light valve onto the display surface.

14. An image projection system including an image display apparatus as in claim 1.

15. A method for operating an image display apparatus comprising:
    controlling a light valve to control at least the intensity of light projected along an optical path form a light source through the light valve, the light valve defining a plurality of light transmitting elements at least the translucency of each of which may be adjusted periodically such that the translucency of each element is substantially constant except during the intervals within which the translucency is being adjusted, and
    actuating a shutter disposed and operated to obstruct the light path through at least one of the light transmitting elements during the intervals within which the translucency of the element is being adjusted.

16. A method as in claim 15 wherein said shutter obstructs the light path through a plurality of said light transmitting elements.

17. A method as in claim 15, wherein said shutter obstructs the light path through all of the light transmitting elements of the light valve.

18. A method as in claim 16 wherein:
    the light transmitting elements are provided in groups of at least one element
    each group being adjusted sequentially at a regular adjustment period,
    each group being adjusted as necessary and at most once each adjustment period, and
    the shutter obstructs the light path for a fixed portion of each adjustment period.

19. A method as in claim 18 wherein each group of light transmitting elements comprises more than one element.

20. A method as in claim 15 wherein intervals during which the light path is unobstructed by the shutter are timed to coincide with periods during which more than one of said light transmitting elements or group of elements is in a constant state.

21. A method as in claim 19 wherein the light transmitting elements are arranged in a matrix array of rows and columns, each one of said rows or columns constituting one of said groups of elements.

22. A method as in claim 15 comprising a plurality of said shutters, each shutter operating to obstruct a different one, or group, of said light valve transmitting elements.

23. A method as in claim 22 wherein the obstructing intervals of each shutter is offset from the obstructing interval of at least one other shutter.

24. A method as in claim 23 wherein each of said plurality of shutters has an obstructing interval offset from the obstructing interval of every other shutter.

25. A method as in claim 18 wherein each of said plurality of shutters has an obstructing interval offset from the obstructing interval of every other shutter;

each shutter of the group operates sequentially, and each shutter in the sequence has an obstructing interval offset from the preceding shutter in the sequence by a time duration equal to the adjustment period of the light valve divided by the number of shutters.

26. A method as in claim 15 wherein the light valve is an LCD panel.

27. A method as in claim 15 wherein the image is displayed on a display surface by projecting light through the light valve onto the display surface.

28. A method for operating an image projection system using the method of claim 15 for operating an image display apparatus.

* * * * *